Mar. 27, 1923.
W. E. LIPPOLD.
NUT LOCK.
FILED AUG. 6, 1921.
1,449,683.
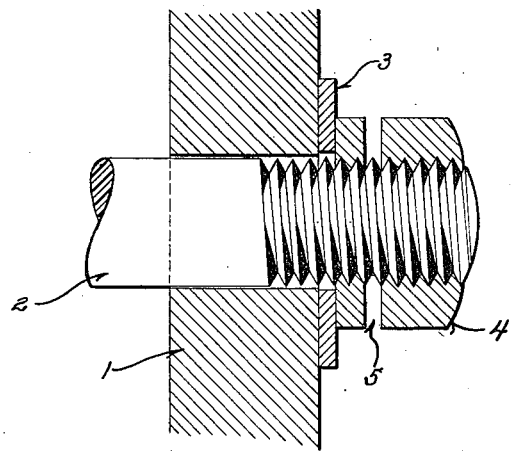
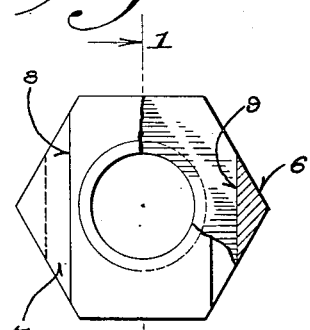
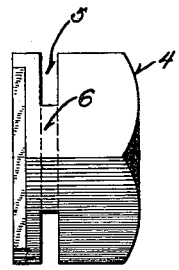
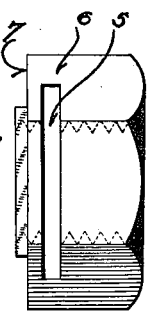
Witness:
Erwin B. Eiring
Inventor:
William E. Lippold
By Young & Young
Attorneys Patented Mar. 27, 1923.

1,449,683

UNITED STATES PATENT OFFICE.

WILLIAM E. LIPPOLD, OF MILWAUKEE, WISCONSIN.

NUT LOCK.

Application filed August 6, 1921. Serial No. 490,280.

*To all whom it may concern:*

Be it known that I, WILLIAM E. LIPPOLD, a citizen of the United States, and resident of Milwaukee, in the county of Milwaukee and State of Wisconsin, have invented certain new and useful Improvements in Nut Locks; and I do hereby declare that the following is a full, clear, and exact description thereof.

My invention has for its object to provide a simple, economical, and effective nut for bolts which will automatically become locked when the nut is tightened.

The invention consists in what is hereinafter described in connection with the accompanying drawing.

In the drawing:—

Figure 1 is a longitudinal sectional view through my improved nut as it is applied to the bolt, the section being taken on the line 1—1 of Figure 2.

Figure 2 is a bottom plan view of the nut with a portion thereof broken away.

Figure 3 is a side elevation of the improved nut, and

Figure 4 is a side elevation taken at right angles to Figure 3.

Referring more specifically to the drawings the numeral 1 indicates a member to be secured by the bolt 2. The usual washer 3 is used in connection with the threaded end of the bolt and the nut 4 is threaded on to the end thereof. A slot 5 is formed in the nut and extends from side to side thereto parallel to its engaging surface and relatively close to the same. The slot intersects the threaded bore of the nut and extends laterally beyond the same leaving a pair of oppositely disposed webs 6 which connect the upper and lower portions of the nut. Rabbets 7 are formed in the edges of the lower surface of the nut beneath the webs 6 and extend inwardly beyond said webs forming shoulders 8.

When the nut is drawn tight the webs 6 exert a pressure on the lower portion of the nut and since the inner bases 9 of the webs are outside of the inner edges 8 of the rabbets, a shearing stress is exerted which develops a slight differential in the female thread between the upper and lower portions of the nut whereby the threads are securely locked with relation to the male threads of the bolt.

I claim:—

A nut for bolts comprising a relatively thick upper portion and a relatively thin lower portion, said portions having their edges connected by a pair of oppositely disposed webs outside the threaded bore, said lower portion having rabbets formed in the edges of its lower surface beneath the webs and extending inwardly beyond said webs but terminating short of the threaded bore and providing a continuous bearing surface completely around said bore.

In testimony that I claim the foregoing I have hereunto set my hand at Milwaukee, in the county of Milwaukee and State of Wisconsin.

WILLIAM E. LIPPOLD.